United States Patent
Lee et al.

(10) Patent No.: US 10,711,122 B2
(45) Date of Patent: Jul. 14, 2020

(54) RUBBER COMPOSITION FOR TIRE TREAD, METHOD FOR PRODUCING THE COMPOSITION, AND TIRE MANUFACTURED USING THE COMPOSITION

(71) Applicant: HANKOOK TIRE CO., LTD., Seoul (KR)

(72) Inventors: Sang Keol Lee, Daejeon (KR); Chang Ho Song, Daejeon (KR); Ji Yeon Lee, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 0 days.

(21) Appl. No.: 16/171,311

(22) Filed: Oct. 25, 2018

(65) Prior Publication Data
US 2019/0300681 A1 Oct. 3, 2019

(30) Foreign Application Priority Data
Apr. 3, 2018 (KR) .................. 10-2018-0038542

(51) Int. Cl.
| | | |
|---|---|---|
| *C08L 9/06* | (2006.01) | |
| *B60C 1/00* | (2006.01) | |
| *C08L 7/00* | (2006.01) | |
| *C08L 9/00* | (2006.01) | |
| *C08L 91/00* | (2006.01) | |

(52) U.S. Cl.
CPC .............. *C08L 9/06* (2013.01); *B60C 1/0016* (2013.01); *C08L 7/00* (2013.01); *C08L 9/00* (2013.01); *C08L 91/00* (2013.01); *C08L 2205/025* (2013.01); *C08L 2205/035* (2013.01); *C08L 2312/00* (2013.01)

(58) Field of Classification Search
CPC ...... C08L 9/06; C08L 7/00; C08L 9/00; C08L 91/00; B60C 1/0016
See application file for complete search history.

(56) References Cited

U.S. PATENT DOCUMENTS

2003/0075253 A1 4/2003 Serra et al.

FOREIGN PATENT DOCUMENTS

| | | | |
|---|---|---|---|
| EP | 1559585 A1 | 8/2005 | |
| EP | 2792689 A1 | 10/2014 | |
| JP | 2001253973 A | 9/2001 | |
| JP | 2009114257 A | 5/2009 | |
| JP | 2010-053282 | * 3/2010 | ............. C08L 21/00 |
| JP | 2010053282 A | 3/2010 | |
| JP | 2014133843 A | 7/2014 | |
| KR | 100964308 B1 | 6/2010 | |
| KR | 100964311 B1 | 6/2010 | |
| KR | 20110025464 A | 3/2011 | |
| KR | 101278216 B1 | 7/2013 | |
| KR | 101313732 B1 | 10/2013 | |
| KR | 20140119116 A | 10/2014 | |
| KR | 20150023116 A | 3/2015 | |
| KR | 101829555 B1 | 3/2018 | |

OTHER PUBLICATIONS

English machine translation of JP 2010-053282. (Year: 2010).*
Patzek W. Tad A First Law Thermodynamic Analysis of Biodiesel Production From Soybean. UT Austin. Apr. 13, 2009. (Year: 2009).*
Extended European Search Report for Application No. 18206108.5 dated Jul. 24, 2019.

* cited by examiner

*Primary Examiner* — John E Uselding
(74) *Attorney, Agent, or Firm* — Renaissance IP Law Group LLP

(57) ABSTRACT

Provided are a rubber composition for a tire tread having improved braking performance, abrasion performance, and anti-aging performance, and a tire manufactured using this rubber composition. Disclosed is a rubber composition for a tire tread, the composition including 100 parts by weight of raw material rubber, 60 to 130 parts by weight of a reinforcing filler, and 10 to 60 parts by weight of modified natural oil, wherein the modified natural oil includes 50% to 90% by weight of a first natural oil; and 10% to 50% by weight of a second natural oil having a weight average molecular weight that is 2 to 10 times the weight average molecular weight of the first natural oil, with respect to the total weight of the modified natural oil.

11 Claims, No Drawings

RUBBER COMPOSITION FOR TIRE TREAD, METHOD FOR PRODUCING THE COMPOSITION, AND TIRE MANUFACTURED USING THE COMPOSITION

CROSS-REFERENCE TO RELATED APPLICATION

This patent application claims the benefit of priority under 35 U.S.C. 119 of Korean Patent Application No. 10-2018-0038542, filed on Apr. 3, 2018, the contents of which are hereby incorporated by reference for all purposes as if fully set forth herein.

BACKGROUND

1. Technical Field

The present disclosure relates to a rubber composition for a tire tread having improved braking performance on a general road surface and an icy and snowy road surface, improved abrasion resistance performance, and improved anti-aging performance, a method for producing the composition, and a tire manufactured using the composition.

2. Description of Related Art

Recently, as the interest and expertise of consumers on automobiles and tires are ever increasing, and a wider variety of commercial products become available, the performance requirements in the automotive industry are becoming more stringent. Major markets of the automotive industry have grown in Europe and North America, and performance aspects centered on steering and braking performance are emphasized in the European market, while stability and durability aspects are considered important in the North American market.

In the European market, a labeling system for tire performance has been adopted since the year 2012, and information on the braking performance on wet road surfaces, the fuel consumption performance, and the noise rating is provided to consumers through the labels attached to tires. Thus, in the tire industry, development of new products has been recently focused on those performances for which information can be provided by labeling, and as a result, a tendency for so-called "trade-off", by which while emphasis is put on one performance, one of other performances is deteriorated, is clearly shown.

Representative examples of trade-off performances include abrasion resistance performance, which is an important factor to the customer satisfaction in connection with the tire purchase cost; snow performance, which significantly affects the braking and steering performance on icy and snowy roads in winter; and fatigue resistance performance, which determines the long-term safety in tire running.

More particularly, to mention about the trade-off performances of a tire for all seasons, generally, the braking performance on a wet road surface, the abrasion performance, and the braking performance on an icy and snowy road surface are directly-opposed performances. The braking performance on a wet road surface can be enhanced by increasing the content of a rubber having the styrene content or by increasing the content of silica as a reinforcing agent; however, since this may increase the hardness and the elastic moduli of rubber, the braking performance on an icy and snowy road surface tends to be rather deteriorated when hardness is decreased.

Furthermore, even from the aspect of the glass transition temperature (Tg) of rubber, the braking performance on a wet road surface is more advantageous at a higher glass transition temperature; however, the abrasion performance and the braking performance on an icy and snowy road surface are more advantageous at a lower glass transition temperature, where the rubber is softer.

The use temperature of a general tire is from −20° C. to 40° C., and the temperature range is broad. However, this temperature range is recognized as a risk element to the tire running stability because the synthetic oil used to facilitate rubber processing may flow out within the tread during driving for a long time on hot asphalt, whose temperature may rise up to 40° C. in summer, and eventually, the eluted synthetic oil may cause a change in the elastic properties of rubber. Particularly, in tires having a filler content of 100 phr or more, the content of synthetic oil must be increased in order to secure the mixing stability of rubber, and this increase in the content of synthetic oil has adverse influence on the long-term durability and aging characteristics of tires (Japanese Patent Application Laid-Open No. 10-2001-253973 (filed on September 18), Korean Registered Patent No. 10-0964308 (filed on Jun. 9, 2010), Korean Registered Patent No. 10-1278216 (filed on Jun. 18, 2013), and Korean Registered Patent No. 10-1313732 (filed on Sep. 25, 2013)).

SUMMARY

An object of the present disclosure is to provide a rubber composition for a tire tread having improved abrasion resistance performance, braking performance on an icy and snowy road surface, and anti-tread aging performance at high temperature, with minimally sacrificed braking performance on a wet road surface.

Another object of the present disclosure is to provide a tire produced using the above-described rubber composition for a tire tread.

The present disclosure provides a rubber composition for a tire tread, the composition comprising 100 parts by weight of raw material rubber; 60 to 130 parts by weight of a reinforcing filler; and 10 to 60 parts by weight of a modified natural oil, in which the modified natural oil includes 50% to 90% by weight of a first natural oil and 10% to 50% by weight of a second natural oil with respect to the total weight of the modified natural oil, and the second natural oil has a weight average molecular weight that is 2 to 10 times the weight average molecular weight of the first natural oil.

The modified natural oil may include 50% to 90% by weight of a first oil having a weight average molecular weight of 500 g/mol or more and less than 2,000 g/mol; and 10% to 50% by weight of a second natural oil having a weight average molecular weight of 2,000 to 7,000 g/mol, with respect to the total weight of the modified natural oil.

The modified natural oil may be any one selected from the group consisting of soybean oil, sunflower seed oil, cottonseed oil, corn oil, canola oil, palm oil, and mixtures thereof.

The rubber composition for a tire tread may further include 1 to 10 parts by weight of an aging inhibitor and 0.5 to 10 parts by weight of a tacky adhesive, with respect to 100 parts by weight of the raw material rubber.

The present disclosure also provides a method for producing a rubber composition for a tire tread, the method comprising a step of modifying natural oil; and a step of mixing 100 parts by weight of a raw material rubber, 60 to 130 parts by weight of a reinforcing filler, and 10 to 60 parts by weight of the modified natural oil, wherein the modified natural oil includes 50% to 90% by weight of a first natural oil and 10% to 50% by weight of a second natural oil having a weight average molecular weight that is 2 to 10 times the weight average molecular weight of the first natural oil.

The step of modifying natural oil may be carried out by adding a crosslinking agent to unmodified natural oil in an amount of 1 to 5 parts by weight with respect to 100 parts by weight of the unmodified natural oil.

The crosslinking agent may be any one selected from the group consisting of elemental sulfur, polymeric sulfur, sulfur powder (S), insoluble sulfur (S), precipitated sulfur (S), colloidal sulfur, tetramethylthiuram disulfide (tetramethylthiuram disulfide, TMTD), dithiodimorpholine, amine disulfide, benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxydiisopropylbenzene, t-butylperoxybenzene, 2,4-dichlorobenzoyl peroxide, 1,1-dibutylperoxy-3,3,5-trimethylsiloxane, n-butyl-4,4-di-t-butyl peroxyvalerate, and combinations thereof.

The step of modifying natural oil may be carried out by modifying unmodified natural oil using a UV curing method of adding a UV photocuring initiator to the unmodified natural oil and irradiating the mixture with ultraviolet radiation having a wavelength of 200 to 400 nm for 1 to 20 minutes.

The step of modifying natural oil may also be carried out by modifying unmodified natural oil using a thermal curing method of adding a thermal curing initiator to the unmodified natural oil and heating the mixture for 1 to 60 minutes at 100° C. to 200° C.

The present disclosure also provides a tire produced using the rubber composition for a tire tread.

The present disclosure can provide a rubber composition for a tire tread having excellent abrasion resistance performance, excellent braking performance on an icy and snowy road surface, and a tread aging resistance performance at high temperature, with minimally sacrificed braking performance on a wet road surface.

The present disclosure can provide a tire produced using the above-described rubber composition for a tire tread.

DETAILED DESCRIPTION

In the following description, the present disclosure will be explained in more detail by describing various constituent components thereof.

The rubber composition for a tire tread according to the present disclosure includes 100 parts by weight of a raw material rubber, 60 to 130 parts by weight of a reinforcing filler, and 10 to 60 parts by weight of a modified natural oil.

1) Raw Material Rubber

The raw material rubber may include 0% to 40% by weight of natural rubber, 60% to 100% by weight of a styrene-butadiene rubber, and 0 to 40% by weight of a neodymium-butadiene rubber.

The term natural rubber is a generic name for rubbers obtainable from nature, and any rubber originating from nature can be used, while there are no limitations on the place of origin or the like. Natural rubber can be described as polyisoprene by the chemical name, and more preferably, natural rubber may include cis-1,4-polyisoprene as a main component.

The natural rubber may be included at a proportion of 0% to 40% by weight with respect to the total weight of the raw material rubber. In a case in which the proportion of the natural rubber is more than 40% by weight, miscibility of the styrene-butadiene rubber and the neodymium-butadiene rubber becomes poor, and problems may occur in the mechanical properties and performance.

The styrene-butadiene rubber (SBR) has a styrene content of 20% to 50% by weight and a vinyl content of 10% to 40% by weight, and has a glass transition temperature (Tg) of −60° C. to −10° C.

The styrene-butadiene rubber can have enhanced grip performance by increasing the glass transition temperature (Tg).

Furthermore, the styrene-butadiene rubber may be included at a proportion of 60% to 100% by weight with respect to the total weight of all the raw material rubbers.

The styrene-butadiene rubber has a wide molecular weight distribution, excellent processability, and a high molecular weight, and thus the styrene-butadiene rubber may also be advantageous for the abrasion resistance performance. More preferably, the weight average molecular weight (Mw) of the anionic polymerized styrene-butadiene rubber may be 500,000 to 1,500,000 g/mol, and the ratio of the weight average molecular weight and the number average molecular weight (Mw/Mn) may be 1.5 to 4. In the case of the raw material rubber used as described above, since the rubber has a low styrene content and a low vinyl content, the glass transition temperature is low, and the braking performance on an icy and snowy road surface may also be advantageous.

The neodymium-butadiene rubber may be a highly cis-neodymium-butadiene rubber having a cis-1,4-butadiene content of 95% by weight or more in the molecule. By using a butadiene rubber having a high content of cis-bonds as such, the abrasion resistance and braking characteristics of the tire rubber composition can be improved.

The glass transition temperature (Tg) of the neodymium-butadiene rubber is −120° C. to −100° C., and the rubber may not contain oil.

The neodymium-butadiene rubber may be included at a proportion of 0% to 40% by weight with respect to the total weight of the raw material rubber, and in a case in which the content of the neodymium-butadiene rubber exceeds 40% by weight, processability may be deteriorated.

Furthermore, the raw material rubber of the present disclosure may further include, in addition to the natural rubber, styrene-butadiene rubber, and butadiene rubber described above, any one selected from the group consisting of polybutadiene rubber, a conjugated diene-aromatic vinyl copolymer, hydrogenated natural rubber, olefin rubber, ethylene-propylene rubber modified with maleic acid, butyl rubber, a copolymer of isobutylene and an aromatic vinyl or diene monomer, acrylic rubber, a rubber containing an ionomer, a halogenated rubber, chloroprene rubber, and mixtures thereof.

2) Reinforcing Filler

Meanwhile, the rubber composition for a tire tread may include any one or all of highly dispersive silica and carbon black as a reinforcing filler.

The reinforcing fiber may be included in an amount of 60 to 130 parts by weight with respect to 100 parts by weight of the raw material rubber, and preferably, the reinforcing filler may be such that 60 to 125 parts by weight of silica and 5 to 70 parts by weight of carbon black are included with respect to 100 parts by weight of the raw material rubber.

In a case in which the silica is included in an amount of less than 60 parts by weight, there is a problem that the braking performance is poor, and when the amount of the silica is more than 125 parts by weight, a problem that the abrasion resistance performance and the fuel consumption performance are deteriorated may occur.

When the carbon black is included in an amount of less than 5 parts by weight, there may be a problem of having poor external appearance and color, and when the content is more than 70 parts by weight, there may be a problem with the fuel consumption and the braking performance on a wet road surface.

The carbon black may be a carbon black of grade GPF (General Purpose Furnace) having a nitrogen adsorption specific surface area (N2SA) of 50 to 100 $m^2/g$ and an oil adsorption number (OAN) value of 100 to 150 cc/100 g.

The highly dispersive silica may be a silica having a nitrogen adsorption value of 160 to 260 $m^2/g$ and a CTAB adsorption value of 150 to 250 $m^2/g$.

In a conventional rubber composition, silica may be oleophilically modified in the rubber through a reaction with a silane coupling agent and be chemically bonded to rubber. In a case in which the surface chemical characteristics of silica are altered as such, the movement of silica within the rubber is restricted, and hysteresis is decreased. As a result, heat generation and rotation resistance of the rubber composition are decreased. However, if dispersing of silica within the rubber is not sufficiently achieved, reductions of the heat generation and rotation resistance may be negligible, and abrasion resistance may be rather decreased. Therefore, the rubber composition for a tire tread according to an embodiment of the present disclosure may further include a silane coupling agent.

Any silane coupling agent can be used without particular limitations as long as it is an agent that is used as a coupling agent for silica in a conventional rubber composition. Specifically, the silane coupling agent may be an agent selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacrylic silane compound, and mixtures thereof.

The sulfide-based silane compound may be any one selected from the group consisting of bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilylbutyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-trimethoxysilylpropyl methacrylate monosulfide, 3-trimethoxysilylpropyl methacrylate monosulfide, and mixtures thereof.

The mercapto silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof. The vinyl-based silane compound may be any one selected from the group consisting of ethoxysilane, vinyltrimethoxysilane, and combinations thereof.

The amino-based silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, and combinations thereof.

The glycidoxy-based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane, and combinations thereof. The nitro-based silane compound may be any one selected from the group consisting of 3-nitropropyltrimethoxysilane, 3-nitropropyltriethoxysilane, and combinations thereof. The chloro-based silane compound may be any one selected from the group consisting of 3-chloropropyltrimethoxysilane, 3-chloropropyltriethoxysilane, 2-chloroethyltrimethoxysilane, 2-chloroethyltriethoxysilane, and combinations thereof.

The methacrylic silane compound may be any one selected from the group consisting of γ-methacryloxypropyltrimethoxysilane, γ-methacryloxypropylmethyldimethoxysilane, γ-methacryloxypropyldimethylmethoxysilane, and combinations thereof.

Among the silane coupling agents described above, when a coupling effect for silica is considered, a sulfide-based silane compound may be preferable, and more preferably, the silane coupling agent may be any one selected from the group consisting of bis(trialkoxysilylpropyl) polysulfide (TESPD), bis-3-triethoxysilylpropyl tetrasulfite (TESPT), and combinations thereof. The TESPD may be a mixture of 50% by weight of TESPT and 50% by weight of carbon black.

The silane coupling agent may be included in an amount of 5 to 15 parts by weight with respect to 100 parts by weight of silica as the reinforcing filler. When the content of the silane coupling agent is less than 5 parts by weight, the effect of changing the surface chemical characteristics for silica may be negligible, and dispersibility of silica may be deteriorated. As a result, reinforcing properties and durability of the tire may be deteriorated. Furthermore, when the content of the silane coupling agent is more than 15 parts by weight, due to the use of an excessive amount of the silane coupling agent, abrasion resistance and fuel consumption performance of the tire may be rather deteriorated. When the significance of the improvement effects is considered, it may be more preferable that the silane coupling agent is included in an amount of 5 to 10 parts by weight with respect to 100 parts by weight of silica as a reinforcing filler.

Furthermore, the rubber composition for a tire tread according to an embodiment of the present disclosure may further include a processing aid for increasing the dispersibility of silica. A silane coupling agent usually takes a role as a bridge that connects between silanol groups at the silica surface and the raw material rubber of the composition, and takes a role of resolving the strong cohesive force between silica and silica when silica is used alone. However, when the silica content or the specific surface area of silica among the rubber components is increased, there are many occasions in which dispersibility is decreased despite of the addition of a silane coupling agent.

In contrast, according to an embodiment of the present disclosure, when a metal salt modified with an aliphatic compound, specifically a fatty acid ester-based compound, and more specifically a fatty acid ester-based compound having 13 to 22 carbon atoms, is further included as a processing aid in the rubber composition for a tire tread, dispersibility of silica that is included in a large amount can be improved, and scorch stability, durability, and abrasion resistance can be enhanced.

The processing aid is an amphiphilic substance containing a hydrophilic group of a metal ion and a hydrophobic group of a fatty acid at the same time. The metal ion reacts with a silanol group at the silica surface and lowers the surface energy between molecules in silica agglomerates that are strongly bonded to one another by hydrogen bonding or dipole bonding, and thereby, the metal ion induces de-agglomeration in a mixing process. As a result, the processing aid lowers the viscosity of the rubber composition for a tire tread, increases flow properties, and enhances scorch stability, durability, and abrasion resistance. The hydrocarbon group of a fatty acid takes a role as a plasticizer that enhances processability by weakening rubber chains (diluting), due to its excellent compatibility with the rubber chains.

Specifically, the metal salt in the processing aid described above may be a zinc soap, a sodium soap, a potassium soap, or a zinc potassium soap. However, a sodium soap and a potassium soap have strong polarity, there is a risk that the soaps may react with silica before silica reacts with the coupling agent, and thereby scorch stability and vulcanization time may be reduced. Accordingly, a zinc soap is more preferable as the metal salt.

Furthermore, it is preferable that the zinc soap contains zinc component at a proportion of 1% to 5% by weight with respect to the total weight of the zinc soap. When the zinc content in the zinc soap is less than 1% by weight, there is a risk that the dispersing effect may be insufficient. When the zinc content is more than 5% by weight, there is a risk that due to an increase in the production of zinc salts, the performances of the rubber composition may be deteriorated.

The fatty acid ester may be specifically an ester of a saturated or unsaturated fatty acid having 12 to 22 carbon atoms, and more specifically an aliphatic or aromatic carboxylic acid.

The modification of a fatty acid ester with respect to the zinc soap can be carried out by mixing the fatty acid ester with the zinc soap at a weight ratio of 20:80 to 40:60 and then subjecting the mixture to a condensation reaction, and at this time, when the mixing weight ratio of the zinc soap in the processing aid and the fatty acid ester is out of the range of 20:80 to 40:60, the dispersibility enhancing effect may be deteriorated.

Furthermore, it is preferable that the processing aid is included in an amount of 0.5 to 5 parts by weight with respect to 100 parts by weight of the raw material rubber. When the content of the processing aid is less than 0.5 parts by weight, the dispersing effect for silica is insufficient, and when the content of the processing aid is more than 5 parts by weight, the extent of effect improvement relative to the amount of use of the processing aid is negligible. Furthermore, when the significance of the improvement effects is considered, it is more preferable that the processing aid is included in an amount of 1 to 3 parts by weight with respect to 100 parts by weight of the raw material rubber.

3) Modified Natural Oil

The modified natural oil may be a modified product of any one natural oil selected from the group consisting of soybean oil, sunflower seed oil, cottonseed oil, corn oil, canola oil, palm oil, and mixtures thereof.

Conventional natural oil obtained from nature has a weight average molecular weight of 2,000 g/mol or less; however, for the purpose of improving the abrasion resistance performance, the braking performance on an icy and snowy road surface, and the anti-aging performance of the tire, a natural oil having its molecular weight increased to 2 to 10 times the molecular weight of existing natural oil can be used.

Specifically, the natural oil may be a modified natural oil including 50% to 90% by weight of a first natural oil; and 10% to 50% by weight of a second natural oil having a weight average molecular weight that is 2 to 10 times the weight average molecular weight of the first natural oil, with respect to the total weight of the natural oil.

A modified natural oil can be obtained by adding a crosslinking agent that can react with the double bonds existing in the molecular chain in order to increase the molecular weight of the natural oil, or by using a UV curing method or a thermal curing method.

Specifically, the modified natural oil may include 50% to 90% by weight of a first oil having a weight average molecular weight of 500 g/mol or more and less than 2,000 g/mol; and 10% to 50% by weight of a second natural oil having a weight average molecular weight of 2,000 to 7,000 g/mol with respect to the total weight of the natural oil.

As the molecular weight of the natural oil becomes large, the phenomenon in which the natural oil is precipitated in the tire when the atmospheric temperature is as high as 30° C. to 40° C. in summer is reduced, and thus the chip-cut phenomenon can be prevented, while the aging-withstanding performance is enhanced. Furthermore, a natural oil having a weight average molecular weight of less than 2,000 g/mol is advantageous for the rotation resistance (RR) performance because the hysteresis relative to the natural oil is small.

The modified natural oil can be used in an amount of 10 to 60 parts by weight with respect to 100 parts by weight of the raw material rubber. In a case in which the modified natural oil is included in an amount of less than 10 parts by weight, there may be a problem of deterioration of miscibility, and in a case in which the amount is more than 60 parts by weight, non-homogeneous mixing caused by slipping at the time of mixing may be induced, and a problem of deteriorated tire performance may occur.

The present disclosure also provides a method for producing a rubber composition for a tire tread, the method including a step of modifying natural oil; and a step of mixing 100 parts by weight of raw material rubber, 60 to 130 parts by weight of a reinforcing filler, and 10 to 60 parts by weight of the modified natural oil.

The modified natural oil may be a natural oil modified by adding 1 to 5 parts by weight of a crosslinking agent with respect to 100 parts by weight of unmodified natural oil.

Specifically, as the crosslinking agent, a sulfur-based crosslinking agent, an organic peroxide, a resin crosslinking agent, or a metal oxide such as magnesium oxide can be used.

Examples of the sulfur-based crosslinking agent that can be used include inorganic crosslinking agents such as sulfur powder (S), insoluble sulfur (S), precipitated sulfur (S), and colloidal sulfur; and organic crosslinking agents such as tetramethylthiuram disulfide (TMTD), tetraethylthiuram disulfide, (TETD), and dithiodimorpholine. In addition to these, elemental sulfur or a crosslinking agent that produces sulfur, for example, amine disulfide or polymeric sulfur, can also be used.

Examples of the organic peroxide that can be used include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy) hexane, 2,5-dimethyl-2,5-di(benzoylperoxy)hexane, 1,3-bis (t-butylperoxypropyl)benzene, di-t-butylperoxydiisopropylbenzene, t-butylperoxybenzene, 2,4-dichlorobenzoyl peroxide, 1,1-dibutylperoxy-3,3,5-trimethylsiloxane, and n-butyl-4,4-di-t-butyl peroxyvalerate.

More preferably, a sulfur crosslinking agent can be used as the crosslinking agent. For example, the sulfur crosslinking agent can be selected from elemental sulfur or a crosslinking agent that produces sulfur, and the crosslinking agent that produces sulfur may be any one selected from the group consisting of amine disulfide, polymeric sulfur, and a mixture thereof. Even more preferably, according to an embodiment of the present disclosure, elemental sulfur can be used as the crosslinking agent.

It is most preferable that the crosslinking agent is included in an amount of 1 to 5 parts by weight with respect to 100 parts by weight of the unmodified natural oil described above.

When the crosslinking agent is included in an amount of less than 1 part by weight, there is only a negligible increase in the molecular weight, and thus an improvement effect may not be obtained. When the amount is more than 5 parts by weight, the molecular weight increases excessively, and there is a disadvantage that the degree of dispersibility of the mixture is lowered.

The above-mentioned mixture may further include a vulcanization accelerator. The vulcanization accelerator means an accelerator that accelerates the rate of vulcanization or accelerates the retardation action in the early vulcanization stage. Regarding the vulcanization accelerator, any one selected from the group consisting of a sulfenamide-based accelerator, a thiazole-based accelerator, a thiuram-based accelerator, a thiourea-based accelerator, a guanidine-based accelerator, a dithiocarbamic acid-based accelerator, an aldehyde-amine-based accelerator, an aldehyde-ammonia-based accelerator, an imidazoline-based accelerator, a xanthate-based accelerator, and combinations thereof can be used.

Regarding the sulfenamide-based vulcanization accelerator, for example, any one sulfenamide-based compound selected from the group consisting of N-cyclohexyl-2-benzothiazole sulfenamide (CBS), N-tert-butyl-2-benzothiazylsulfenamide (TBBS), N,N-dicyclohexyl-2-benzothiazylsulfenamide, N-oxydiethylene-2-benzothiazylsulfenamide, N,N-diisopropyl-2-benzothiazolsulfenamide, and combinations thereof can be used.

Regarding the thiazole-based vulcanization accelerator, for example, any one thiazole-based compound selected from the group consisting of 2-mercaptobenzothiazole (MBT), dibenzothiazyl disulfide (MBTS), 2-mercaptobenzothiazole sodium salt, 2-mercaptobenzothiazole zinc salt, 2-mercaptobenzothiazole copper salt, 2-mercaptobenzothiazole cyclohexylamine salt, 2-(2,4-dinitrophenyl)mercaptobenzothiazole, 2-(2,6-diethyl-4-morpholinothio)benzothiazole, and combinations thereof can be used.

Regarding the thiuram-based vulcanization accelerator, for example, any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof can be used.

Regarding the thiourea-based vulcanization accelerator, for example, any one thiourea-based compound selected from the group consisting of thiacarbamide, diethylthiourea, dibutylthiourea, trimethylthiourea, di-ortho-tolylthiourea, and combinations thereof can be used.

Regarding the guanidine-based vulcanization accelerator, for example, any one guanidine-based compound selected from the group consisting of diphenylguanidine, di-ortho-tolylguanidine, triphenylguanidine, ortho-tolylbiguanide, diphenylguanidine phthalate, and combinations thereof can be used.

Regarding the dithiocarbamic acid-based vulcanization accelerator, for example, any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecylisopropyldithiocarbamate, zinc octadecylisopropyldithiocarbamate, zinc dibenzyldithiocarbamate (ZBEC), sodium diethyldithiocarbamate, piperidine pentamethylenedithiocarbamate, selenium dimethyldithiocarbamate, tellurium diethyldithiocarbamate, cadmium diamyldithiocarbamate, and combinations thereof can be used.

Regarding the aldehyde-amine-based or aldehyde-ammonia-based vulcanization accelerator, for example, any one aldehyde-amine-based or aldehyde-ammonia-based compound selected from the group consisting of acetaldehyde-aniline reaction product, butyl aldehyde-aniline condensation product, hexamethylenetetramine, acetaldehyde-ammonia reaction product, and combinations thereof can be used.

Regarding the imidazoline-based vulcanization accelerator, for example, an imidazoline-based compound such as 2-mercaptoimidazoline can be used, and regarding the xanthate-based vulcanization accelerator, for example, a xanthate-based compound such as zinc dibutyl xanthogenate can be used.

More preferably, it is preferable that any one compound selected from the group consisting of amine, disulfide, guanidine, thiourea, thiazole, thiuram, sulfenamide, and mixtures thereof is included as the vulcanization accelerator in an amount of 1.0 to 2.5 parts by weight with respect to 100 parts by weight of the raw material rubber, from the viewpoint of increasing the productivity through acceleration of the vulcanization rate and from the viewpoint of maximizing enhancements of the physical properties of rubber.

A vulcanization accelerator aid is an additive used in combination with the vulcanization accelerator to complete the acceleration effect of the accelerator, and any one selected from the group consisting of an inorganic vulcanization acceleration aid, an organic vulcanization acceleration aid, and combinations thereof can be used.

Regarding the inorganic vulcanization acceleration aid, any one selected from the group consisting of zinc oxide (ZnO), zinc carbonate, magnesium oxide (MgO), lead oxide, potassium hydroxide, and combinations thereof can be used. Regarding the organic vulcanization acceleration aid, any one selected from the group consisting of stearic acid, zinc stearate, palmitic acid, linoleic acid, oleic acid, lauric acid, dibutylammonium oleate, derivatives thereof, and combinations thereof can be used.

Particularly, zinc oxide and stearic acid can be used together as the vulcanization acceleration aids, and in this case, zinc oxide dissolves in stearic acid to form a complex effective for the vulcanization accelerators described above. This complex produces sulfur that is advantageous in the vulcanization reaction, and thereby, the crosslinking reaction for rubber can be facilitated. In the case of using zinc oxide and stearic acid together, it is preferable to use the respectively compounds in an amount of 1 to 10 parts by weight with respect to 100 parts by weight of the raw material rubber, in order for the compounds to appropriately accomplish the role as vulcanization acceleration aids.

Alternatively, the modified natural oil may be a product obtained by modifying unmodified natural oil using a UV curing method of adding a UV-curable initiator to the natural oil and irradiating the mixture with ultraviolet radiation having a wavelength of 200 to 400 nm from a UV lamp for 1 to 20 minutes. Regarding the photocuring initiator, a phosphine oxide-based compound can be used.

The modified natural oil may also be a product obtained by modifying unmodified natural oil using a thermal curing method of adding a thermal curing initiator and heating the mixture for 1 to 60 minutes at 100° C. to 200° C. The thermal curing initiator may be an aromatic onium salt, and specifically, benzylpyrazinium hexafluoroantimonate (BPH) can be used.

The photocuring initiator or thermal curing initiator may be added in an amount of 0.5 to 5 parts by weight with respect to 100 parts by weight of unmodified natural oil.

4) Other Additives

The rubber composition for a tire tread according to the present disclosure may optionally further include additives such as an aging inhibitor and a tacky adhesive, singly or as a mixture of two or more kinds thereof, in addition to the components described above.

The aging inhibitor is an additive used to terminate a chain reaction by which the tire is automatically oxidized by oxygen. In addition to the aging preventive action, the aging inhibitor should have high solubility for rubber and low volatility, should be inert to rubber, and should not inhibit vulcanization. Regarding the aging inhibitor, any one selected from the group consisting of an amine-based compound, a phenolic compound, a quinoline-based compound, an imidazole-based compound, a carbamic acid metal salt, a wax, and combinations thereof can be used.

Regarding the amine-based aging inhibitor, any one selected from the group consisting of N-(1,3-dimethylbutyl)-N'-phenyl-p-phenylenediamine, N-phenyl-N'-isopropyl-p-phenylenediamine, N,N'-diphenyl-p-phenylenediamine, N,N'-diallyl-p-phenylenediamine, N-phenyl-N'-cyclohexyl-p-phenylenediamine, N-phenyl-N'-octyl-p-phenylenediamine, and combinations thereof can be used.

Regarding the phenolic aging inhibitor, any one selected from the group consisting of 2,2'-methylene-bis(4-methyl-6-tert-butylphenol), 2,2'-isobutylidene-bis(4,6-dimethylphenol), 2,6-di-t-butyl-p-cresol, and combinations thereof can be used.

Regarding the quinoline-based aging inhibitor, any one selected from the group consisting of 2,2,4-trimethyl-1,2-dihydroquinoline and derivatives thereof can be used, and specifically, any one selected from the group consisting of 6-ethoxy-2,2,4-trimethyl-1,2-dihydroquinoline, 6-anilino-2, 2,4-trimethyl-1,2-dihydroquinoline, 6-dodecyl-2,2,4-trimethyl-1,2-dihydroquinoline, and combinations thereof can be used.

Regarding the wax, waxy hydrocarbons can be preferably used.

It is preferable that the aging inhibitor includes any one compound selected from the group consisting of N-(1,3-dimethylbutyl)-N-phenyl-p-phenylenediamine (6PPD), N-phenyl-n-isopropyl-p-phenylenediamine (3PPD), poly(2, 2,4-trimethyl-1,2-dihydroquinoline) (RD), and mixtures thereof in an amount of 1 to 5 parts by weight with respect to 100 parts by weight of the raw material rubber, from the viewpoints of aging preventive action and rubber solubility.

The tacky adhesive further enhances the tack performance between rubber and rubber, improves miscibility, dispersibility, and processabilitiy of other additives such as a filler, and thus contributes to the enhancement of the physical properties of rubber.

Regarding the tacky adhesive, a natural resin-based tacky adhesive such as a rosin-based resin or a terpene-based resin; or a synthetic resin-based tacky adhesive such as a petroleum resin, coal tar or an alkylphenol-based resin can be used.

The rosin-based resin may be any one selected from the group consisting of a rosin resin, a rosin ester resin, a hydrogenated rosin ester resin, derivatives thereof, and combinations thereof. The terpene-based resin may be any one selected from the group consisting of a terpene resin, a terpene phenol resin, and combinations thereof.

The petroleum resin may be any one selected from the group consisting of an aliphatic resin, an acid-modified aliphatic resin, an alicyclic resin, a hydrogenated alicyclic resin, an aromatic (C9) resin, a hydrogenated aromatic resin, a C5-C9 copolymer resin, a styrene resin, a styrene copolymer resin, and combinations thereof.

The coal tar may be a coumarone-indene resin.

The alkylphenol resin may be a p-tert-alkylphenol formaldehyde resin, and the p-tert-alkylphenol formaldehyde resin may be any one selected from the group consisting of a p-tert-butyphenol formaldehyde resin, a p-tert-octylphenol formaldehyde resin, and combinations thereof.

The tacky adhesive may be included in an amount of 0.5 to 10 parts by weight with respect to 100 parts by weight of the raw material rubber. When the content of the tacky adhesive is less than 0.5 parts by weight with respect to 100 parts by weight of the raw material rubber, the adhesion performance is deteriorated. When the content is more than 10 parts by weight, the physical properties of rubber may be deteriorated, which is not preferable.

The present disclosure can provide a method for producing a rubber composition for a tire tread. Specifically, the method for producing a rubber composition for a tire tread includes a step of modifying natural oil; and a step of mixing 100 parts by weight of raw material rubber, 60 to 130 parts by weight of a reinforcing filler, and 10 to 60 parts by weight of the modified natural oil.

The step of mixing may be achieved by a two-stage continuous process including a first step of performing a thermomechanical treatment or kneading at a maximum temperature of up to 110° C. to 190° C., and preferably at a high temperature of 130° C. to 180° C.; and during a finishing step of mixing the crosslinked system, a second step of performing a mechanical treatment typically at below 110° C., for example, at a low temperature of 40° C. to 100° C.; however, the present disclosure is not limited to this.

The step of modifying natural oil may be achieved by adding 1 to 5 parts by weight of a crosslinking agent to 100 parts by weight of unmodified natural oil and thereby modifying the natural oil. The details of the crosslinking agent are similar to the explanation given above.

The step of modifying natural oil may also be achieved using a UV curing method of adding a UV photocuring initiator to unmodified oil and irradiating the mixture with ultraviolet radiation having a wavelength of 200 to 400 nm for 1 to 20 minutes, or may be achieved using a thermal curing method of adding a thermal curing initiator to unmodified natural oil and heating the mixture for 1 to 60 minutes at 100° C. to 200° C.

A rubber composition for a tire tread produced by the method as described above includes a composite material including particulate carbon black and a particulate silane coupling agent, the composite material having optimized physical characteristics in consideration of an effect of improving dispersibility of silica, together with silica as a reinforcing filler. Accordingly, the rubber composition can have enhanced abrasion resistance and cut-chip performance while maintaining the fuel consumption performance, and can have improved external appearance characteristics of the tire, including the degree of coloration. Therefore, this rubber composition for a tire tread is not limited to a tread (tread cap and tread base) and may be included into various rubber constituent elements that constitute the tire. Examples of the rubber constituent elements include sidewalls, sidewall insertions, apex, chafers, wire coats, and inner liners.

According to another preferred embodiment of the present disclosure, a tire produced using the rubber composition for a tire tread as described above can be provided.

This tire is produced from the rubber composition for a tire tread described above and shows improved abrasion resistance and cut-chip performance together with excellent low fuel consumption performance, and also shows enhanced external appearance characteristics.

A method for manufacturing the tire, any conventional method used for the manufacture of tires can be applied, except that the rubber composition for a tire tread described above is used. Thus, repeated description of the details of the present disclosure will not be repeated here. However, the tire may include a tire tread produced using the rubber composition for a tire tread described above.

The tire may be a tire for a passenger car, a tire for a racing car, a tire for an airplane, a tire for an agricultural machine, an off-road tire, a truck tire, a bus tire, or the like. Furthermore, the tire may be a radial tire or a bias tire, and a radial tire is preferred.

Hereinafter, the rubber composition for a tire tread of the present disclosure and a tire including the rubber composition will be described in detail by way of specific Examples so that any person having ordinary skill in the art to which the present disclosure is pertained can easily carry out the inventive concepts. However, the present disclosure can be realized in various different embodiments, and the following Examples are only provided to illustrate the present disclosure in more detail and are not intended to limit the technical scope of the present disclosure.

Production Example 1: Production of Natural Oil

Soybean oil produced by a conventional method was mixed with sulfur and an accelerator, and the mixture was stirred to modify the soybean oil.

Modified natural oils were produced by adjusting the contents of the soybean oil, sulfur, and accelerator as disclosed in Table 1, and varying the content of sulfur from 1 to 5 parts by weight with respect to 100 parts by weight of soybean oil. The molecular weight distributions of the modified natural oils were checked.

TABLE 1

|  | Unmodified natural oil | Modified natural oil 1 | Modified natural oil 2 | Modified natural oil 3 |
|---|---|---|---|---|
| Soybean oil | 140 g | 140 g | 140 g | 140 g |
| Sulfur | 0 | 1.40 g | 4.20 g | 7.00 g |
| CBS | 0 | 2.80 g | 8.40 g | 14.00 g |
| ZBEC | 0 | 0.28 g | 0.84 g | 1.40 g |
| Weight average molecular weight (g/mol) | 1342 (100 wt %) | 1342 (88 wt %) 3133 (12 wt %) | 1342 (72 wt %) 2884 (18 wt %) 5413 (10 wt %) | 1342 (59 wt %) 2898 (21 wt %) 6400 (20 wt %) |

CBS: accelerator, N-cyclohexyl-2-benzothiazole sulfenamide
ZBEC: accelerator, zinc dibenzyl dithiocarbamate According to Table 1, it can be seen that the unmodified soybean oil was composed of only one kind of fatty acid having a weight average molecular weight of 1,342 g/mol, and after modification, the contents of fatty acids having a molecular weight of 2,000 g/mol or more were increased.

Specifically, it was confirmed that modified natural oil 1 obtained by adding sulfur in an amount of 1 part by weight with respect to 100 parts by weight of soybean oil included 88% by weight of a fatty acid having a weight average molecular weight of 1,342 g/mol and 12% by weight of a fatty acid having a weight average molecular weight of 3,133 g/mol. Modified natural oil 2 obtained by adding sulfur in an amount of 3 parts by weight included 72% by weight of a fatty acid having a weight average molecular weight of 1,342 g/mol, 18% by weight of a fatty acid having a weight average molecular weight of 2,884 g/mol, and 10% by weight of a fatty acid having a weight average molecular weight of 5,413 g/mol. Modified natural oil 3 obtained by adding 5 parts by weight of sulfur included 59% by weight of a fatty acid having a weight average molecular weight of 1,342 g/mol, 21% by weight of a fatty acid having a weight average molecular weight of 2,898 g/mol, and 20% by weight of a weight average molecular weight of 6,400 g/mol.

Production Example 2: Production of Rubber Composition

Rubber compositions for tire treads according to the following Examples and Comparative Examples were produced using the compositions described in the following Table 2. Production of the rubber compositions was carried out by a conventional method for producing a rubber composition.

TABLE 2

|  | Comparative Example 1 | Example 1 | Example 2 | Example 3 | Comparative Example 2 |
|---|---|---|---|---|---|
| Raw material rubber | 100 | 100 | 100 | 100 | 100 |
| Reinforcing filler | 95 | 95 | 95 | 95 | 95 |
| Unmodified natural oil | 20 | — | — | — | — |
| Modified natural oil 1 | — | 20 | — | — | — |

TABLE 2-continued

| | Comparative Example 1 | Example 1 | Example 2 | Example 3 | Comparative Example 2 |
|---|---|---|---|---|---|
| Modified natural oil 2 | — | — | 20 | — | — |
| Modified natural oil 3 | — | — | — | 20 | — |
| Processed oil | 20 | 20 | 20 | 20 | 40 |
| Zinc oxide | 2 | 2 | 2 | 2 | 2 |
| Stearic acid | 1 | 1 | 1 | 1 | 1 |
| Sulfur | 0.7 | 0.7 | 0.7 | 0.7 | 0.7 |
| Main accelerator | 2 | 2 | 2 | 2 | 2 |
| Auxiliary accelerator | 0.2 | 0.2 | 0.2 | 0.2 | 0.2 |

Raw material rubber: 10% by weight of natural rubber, 60% by weight of styrene-butadiene rubber, and 30% by weight of neodymium-butadiene rubber
Reinforcing filler: Silica 7000 GR Grade
Processed oil: TDAE oil
Main accelerator: N-cyclohexyl-2-benzothiazole sulfenamide (CBS)
Auxiliary accelerator: Zinc dibenzyl dithiocarbamate (ZBEC)

Experimental Example: Measurement of Physical Properties of Rubber Compositions Thus Produced For rubber specimens produced in Examples and Comparative Examples described above, physical properties were measured, and the results are presented in the following Table 3.

TABLE 3

| Item | | Comparative Example 1 | Example 1 | Example 2 | Example 3 | Comparative Example 2 |
|---|---|---|---|---|---|---|
| ML1 + 4 | MU | 99 | 98 | 93 | 97 | 103 |
| t5 | min | 8.0 | 7.0 | 5.3 | 4.3 | 8.7 |
| Tmax | lbf-in | 27.3 | 27.5 | 29.0 | 29.6 | 28.8 |
| Tmin | lbf-in | 7.8 | 7.0 | 6.8 | 6.7 | 7.2 |
| t50 | min | 3.3 | 3.3 | 2.6 | 2.3 | 3.7 |
| t90 | min | 7.5 | 8.3 | 7.4 | 8.0 | 7.3 |
| S-S | Hardness | 73 | 73 | 73 | 75 | 75 |
| | 10 modulus | 9.7 | 9.45 | 9.54 | 10.18 | 10.47 |
| | 100 modulus | 28.39 | 28.65 | 29.3 | 32.72 | 31.07 |
| | 300 modulus | 110.26 | 115.29 | 119.42 | 133.312 | 124.78 |
| | Elongation | 541.89 | 516.97 | 515.85 | 450.42 | 482.32 |
| 0° C. | G" | 4.99E+06 | 5.05E+06 | 5.24E+06 | 5.60E+06 | 6.61E+06 |
| 60° C. | tanδ | 0.125 | 0.126 | 0.122 | 0.119 | 0.126 |
| Tg | ° C. | −30° C. | −30° C. | −30° C. | −30° C. | −25° C. |
| Abrasion | Index | 110 | 112 | 115 | 120 | 100 |

Mooney viscosity (ML1+4, 125° C.) was determined using a Mooney viscometer, Mooney MV2000 (Alpha Technologies, Inc.) under the conditions of Large Rotor, a preheating time of 1 minute, a rotor operation time of 4 minutes, and a temperature of 125° C. Mooney viscosity is a value representing the viscosity of unvulcanized rubber, and a lower value means superior processability of unvulcanized rubber.

Scorch stability (t5): Measured using Mooney MV2000 (Alpha Technologies, Inc.) under the conditions of Large Rotor, a preheating time of 1 minute, a rotor operation time of 4 minutes, and a temperature of 138° C. The scorch time is a value obtained by measuring the time taken for the Mooney viscosity to increase from the minimum value by 5 points. A long time means improved scorch stability.

Tmax represents the maximum time taken for the Mooney viscosity to increase from the minimum value by 5 points; Tmin represents the minimum time taken for the Mooney viscosity to increase from the minimum value by 5 points; t50 represents the time taken for the Mooney viscosity to increase by 50 points; and t90 represents the time taken for the Mooney viscosity to increase by 90 points.

S-S (Hardness) represents hardness, and this was measured by DIN 53505. Hardness corresponds to steering stability, and a higher value means superior steering stability performance.

Moduli were obtained by measuring the tensile strengths at elongations of 10%, 100%, and 300% according to ISO 37 standards, and a higher value means superior strength.

Viscoelasticity was measured using a Dynamic Material Testing System (DMTS) tester while performing temperature sweeping from −60° C. to 80° C. under the conditions of 10 Hz, a static strain of 5%, and a dynamic strain of 0.5%. At this time, as the tan δ value at 0° C. is higher, the braking performance on a wet road surface is superior; and as the value of 60° C. tan δ value is lower, the tire has lower rotation performance.

Tg (glass transition temperature): considered as one of the conditions of a winter tire for driving on a snowy road or an icy road. A lower glass transition temperature can maintain the grip force for the road surface even at a low temperature in winter.

Abrasion resistance index shows a value indexed based on Comparative Example 2 using a LAT-100 tester (Laboratory Abrasion Tester-100). A higher abrasion resistance index means superior abrasion resistance perforce.

As described above, in the case of Examples in which modified natural oils were used instead of existing synthetic oil or unmodified natural oil, results with enhanced rotation resistance and abrasion resistance performance were shown while sacrifice of the braking performance on a wet road surface was minimized. It was also confirmed that anti-aging characteristics that affect long-term long-distance driving of cars were also excellent.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

What is claimed is:

1. A rubber composition for a tire tread, the composition comprising:
   100 parts by weight of raw material rubber;
   60 to 130 parts by weight of a reinforcing filler; and
   10 to 60 parts by weight of a modified natural oil,
   wherein the modified natural oil includes 50% to 90% by weight of a first natural oil and 10% to 50% by weight of a second natural oil having a weight average molecular weight that is 2 to 10 times the weight average molecular weight of the first natural oil; and
   wherein the modified natural oil is any one selected from the group consisting of soybean oil, sunflower seed oil, cottonseed oil, corn oil, canola oil, palm oil, and mixtures thereof.

2. The rubber composition for a tire tread according to claim 1, wherein the modified natural oil includes 50% to 90% by weight of a first natural oil having a weight average molecular weight of 500 g/mol or more and less than 2,000 g/mol and 10% to 50% by weight of a second natural oil having a weight average molecular weight of 2,000 g/mol to 7,000 g/mol, with respect to the total weight of the modified natural oil.

3. The rubber composition for a tire tread according to claim 1, wherein the rubber composition for a tire tread further comprises 1 to 10 parts by weight of an aging inhibitor and 0.5 to 10 parts by weight of a tacky adhesive with respect to 100 parts by weight of the raw material rubber.

4. A method for producing a rubber composition for a tire tread, the method comprising:
   a step of modifying natural oil; and
   a step of mixing 100 parts by weight of raw material rubber, 60 to 130 parts by weight of a reinforcing filler, and 10 to 60 parts by weight of the modified natural oil,
   wherein the modified natural oil includes 50% to 90% by weight of a first natural oil and 10% to 50% by weight of a second natural oil having a weight average molecular weight that is 2 to 10 times the weight average molecular weight of the first natural oil, with respect to the total weight of the natural oil; and
   wherein the modified natural oil is any one selected from the group consisting of soybean oil, sunflower seed oil, cottonseed oil, corn oil, canola oil, palm oil, and mixtures thereof.

5. The method for producing a rubber composition for a tire tread according to claim 4, wherein the step of modifying natural oil is carried out by adding a crosslinking agent to unmodified natural oil in an amount of 1 to 5 parts by weight with respect to 100 parts by weight of the unmodified natural oil.

6. The method for producing a rubber composition for a tire tread according to claim 5, wherein the crosslinking agent is any one selected from the group consisting of elemental sulfur, polymeric sulfur, sulfur powder (S), insoluble sulfur (S), precipitated sulfur (S), colloidal sulfur, tetramethylthiuram disulfide (TMTD), tetraethylthiuram disulfide (TETD), dithiodimorpholine, amine disulfide, benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxydiisopropylbenzene, t-butyllperoxybenzene, 2,4-dichlorobenzoyl peroxide, 1,1-dibutylperoxy-3,3,5-trimethylsiloxane, n-butyl-4,4-di-t-butylperoxyvalerate, and combinations thereof.

7. The method for producing a rubber composition for a tire tread according to claim 4, wherein the modified natural oil is a product obtained by modifying unmodified natural oil using a UV curing method of adding a UV photocuring initiator to the unmodified natural oil and irradiating the mixture with ultraviolet radiation having a wavelength of 200 to 400 nm for 1 to 20 minutes.

8. The method for producing a rubber composition for a tire tread according to claim 4, wherein the modified natural oil is a product obtained by modifying unmodified natural oil using a thermal curing method of adding a thermal curing initiator and heating the mixture for 1 to 60 minutes at 100° C. to 200° C.

9. A tire manufactured by using the rubber composition for a tire tread according to claim 1.

10. A tire manufactured by using the rubber composition for a tire tread according to claim 2.

11. A tire manufactured by using the rubber composition for a tire tread according to claim 3.

* * * * *